United States Patent
Shibuya et al.

(10) Patent No.: US 11,353,635 B2
(45) Date of Patent: Jun. 7, 2022

(54) DIFFUSER PLATE, DESIGNING METHOD OF DIFFUSER PLATE, DISPLAY DEVICE, PROJECTION DEVICE, AND LIGHTING DEVICE

(71) Applicant: DEXERIALS CORPORATION, Tokyo (JP)

(72) Inventors: Kazuyuki Shibuya, Tokyo (JP); Hideto Sagawa, Tokyo (JP); Takahiro Kimura, Tokyo (JP); Naoki Hanashima, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 292 days.

(21) Appl. No.: 16/271,965

(22) Filed: Feb. 11, 2019

(65) Prior Publication Data
US 2019/0250313 A1    Aug. 15, 2019

(30) Foreign Application Priority Data
Feb. 14, 2018    (JP) ............................. JP2018-024427

(51) Int. Cl.
*G02B 5/02*    (2006.01)
*G02B 3/00*    (2006.01)
(Continued)

(52) U.S. Cl.
CPC ............ *G02B 5/0221* (2013.01); *G02B 1/115* (2013.01); *G02B 3/0043* (2013.01);
(Continued)

(58) Field of Classification Search
CPC .... G02B 5/0221; G02B 1/115; G02B 3/0043; G02B 5/0252; G02B 5/0294;
(Continued)

(56) References Cited

U.S. PATENT DOCUMENTS

2008/0049165 A1    2/2008    Min et al.
2015/0293271 A1 *  10/2015   Miyasaka ............ G02B 5/0278
                                                          353/38
(Continued)

FOREIGN PATENT DOCUMENTS

CN    102017199 A    4/2011
CN    104237980 A    12/2014
(Continued)

OTHER PUBLICATIONS

Nov. 30, 2021, Japanese Office Action issued for related JP Application No. 2018-024427.
(Continued)

*Primary Examiner* — Ephrem Z Mebrahtu
(74) *Attorney, Agent, or Firm* — Paratus Law Group, PLLC

(57) ABSTRACT

There is provided a microlens array diffuser plate including: a microlens group positioned on a surface of a transparent substrate. The microlens group at least corresponding to a light ray entering part in the microlens array diffuser plate includes two or more unit cells that are continuous in an array sequence, and the unit cells include a plurality of microlenses positioned on the surface of the transparent substrate. The light ray entering part has at least two regions having different average diffusion angles.

14 Claims, 13 Drawing Sheets

(51) Int. Cl.
*G02B 1/115* (2015.01)
*G03B 21/62* (2014.01)

(52) U.S. Cl.
CPC ......... *G02B 5/0252* (2013.01); *G02B 5/0294* (2013.01); *G03B 21/62* (2013.01)

(58) Field of Classification Search
CPC .. G02B 3/0056; G02B 3/0087; G02B 3/0068; G02B 6/0006; G02B 5/0226; G02B 5/0278; G02B 5/0231; G02B 5/0215; G02B 5/02; G02B 5/0205; F21V 5/04; F21V 5/02; F21V 5/004; G02F 1/133606; G03B 21/625
See application file for complete search history.

(56) References Cited

U.S. PATENT DOCUMENTS

| | | | |
|---|---|---|---|
| 2017/0184951 A1 | 6/2017 | Kurosaki | |
| 2017/0235028 A1* | 8/2017 | Uchida | G02B 27/48 359/599 |
| 2017/0285341 A1* | 10/2017 | Nakagawa | G02B 3/0056 |
| 2018/0185875 A1* | 7/2018 | Murakami | C03C 21/002 |
| 2020/0319379 A1* | 10/2020 | Dross | G02B 27/0012 |

FOREIGN PATENT DOCUMENTS

| | | |
|---|---|---|
| JP | 2013-195489 A | 9/2013 |
| JP | 2014-167550 A | 9/2014 |
| JP | 2016-114771 A | 6/2016 |
| JP | 2017-083815 A | 5/2017 |

OTHER PUBLICATIONS

Jan. 6, 2022, Chinese Office Action issued for related CN Application No. 201910103829.7.

Apr. 5, 2022, Japanese Office Action issued for related JP Application No. 2018-024427.

* cited by examiner

HALF LENS PORTION

HALF LENS PORTION

DIFFUSER PLATE, DESIGNING METHOD OF DIFFUSER PLATE, DISPLAY DEVICE, PROJECTION DEVICE, AND LIGHTING DEVICE

CROSS REFERENCE TO RELATED APPLICATIONS

This application claims the benefit of Japanese Priority Patent Application JP 2018-024427 filed Feb. 14, 2018, the entire contents of which are incorporated herein by reference.

BACKGROUND

The present invention relates to a diffuser plate, a designing method of the diffuser plate, a display device, a projection device, and a lighting device.

A diffuser plate that scatters incoming light to various directions is widely utilized in various devices, for example, a display device such as a display, a projection device such as a projector, and various types of lighting devices. An incoming light diffusing mechanism in this diffuser plate is roughly classified into a mechanism that utilizes light refraction resulting from the surface shape of the diffuser plate and a mechanism that utilizes scattering by a substance existing inside a bulk body and having different refractive index from the circumference. One of the diffuser plates which utilize the light refraction resulting from the surface shape is what is called a microlens array diffuser plate including a plurality of microlenses having sizes of approximately several tens of micrometers and located on the surface of the bulk body. For a microlens array diffuser plate, various methods of suppressing occurrence of diffracted light by making the lens shape or lens location irregular.

In recent years, as a light source for a display device, a projection device, and a lighting device as described above, a light source that outputs light rays having high linearity and high coherence, such as laser light, has come to be used. Since coherence of incoming light increases in the case where such light rays having high linearity and high coherence enter a microlens array diffuser plate, not only the lens location but also an influence exerted by a boundary portion between lenses is non-negligible for suppression of a diffracted light component, and only a lens portion present within a radiated spot comes to exert an influence upon outgoing light. Further, in order to keep durability even at a high light intensity density within the spot, it is important to form the whole diffuser plate including the lens portion using appropriate materials. From the viewpoints as described above, a technology concerning a diffuser plate that exhibits an excellent diffusion property, has an excellent durability with respect to light having high coherence, and can be produced with higher productivity is disclosed in JP 2017-83815A.

SUMMARY

However, it has been revealed that, even in the case of using a diffuser plate as disclosed in the above-described JP 2017-83815A, the light quantity at the central part of the diffuser plate increases to make the light quantity distribution nonuniform or to widen the diffusion angle in the case of using a laser array light source in which a plurality of laser diodes are located in a grid as a light source having higher coherence, so that there are cases where a reduction in diffused light quantity within a desired diffusion angle range occurs.

Therefore, the present invention was made in view of the above-described problems, and an object of the present invention is to provide a diffuser plate, a designing method of the diffuser plate, a display device, a projection device, and a lighting device that can make the diffusion intensity uniform even in the case where light rays output from a light source having higher coherence enter.

To solve the problem described above, according to an aspect of the present invention, there is provided a microlens array diffuser plate including: a microlens group positioned on a surface of a transparent substrate. The microlens group at least corresponding to a light ray entering part in the microlens array diffuser plate includes two or more unit cells that are continuous in an array sequence, and the unit cells include a plurality of microlenses positioned on the surface of the transparent substrate. The light ray entering part has at least two regions having different average diffusion angles. In a first region and a second region positioned closer to an end side of the light ray entering part than the first region in a manner that the second region is adjacent to the first region and having an average diffusion angle smaller than an average diffusion angle of the first region among the regions having different average diffusion angles, average radii of curvature of the unit cells that constitute the respective regions satisfy a relational expression expressed by Expression (1) below.

It is preferable in the microlens array diffuser plate that, at least in the light ray entering part, ridge lines between the microlenses adjacent to each other be nonparallel to each other, and be nonparallel to the transparent substrate, and planar positions and height positions of vertices of the respective microlenses and location of the ridge lines between the microlenses be made irregular such that a diffraction phenomenon is suppressed.

It is preferable that the first region be positioned at a central portion of the light ray entering part, and the second region be positioned to surround the first region.

An incoming light ray may be a collection of spot light rays output from a plurality of light sources. The first region and the second region may be located such that the first region has an outer periphery positioned on an inner side of a region of projection of the collection of spot light rays onto the microlens array diffuser plate, and the second region has an outer periphery positioned on an outer side of the region of projection.

An (N+1)-th region that satisfies the relational expression expressed by the Expression (1) may exist in a manner that the (N+1)-th region is adjacent to an N-th (N≥2) region and surrounds the N-th region. At least one region among N+1 regions may have an outer periphery positioned on an outer side of a region of projection of a collection of spot light rays output from a plurality of light sources onto the microlens array diffuser plate.

It is preferable that the first region have an area of more than or equal to 0.04% and less than or equal to 85% of an area of a region used as a diffuser plate, and more than or equal to 0.05% and less than or equal to 92% of an area of a region of projection of a collection of spot light rays output from a plurality of light sources onto the diffuser plate.

An incoming light ray may be a collection of spot light rays output from a plurality of light sources. The unit cells may each have an area larger than an area of one of the spot light rays.

The unit cells may each have a diagonal line having a length of less than or equal to 3 mm.

Antireflection layers on surfaces of the microlenses and a surface of the transparent substrate on which the microlens group is not arranged may be included.

Each of the antireflection layers may be a multilayered structure including $Nb_2O_5$ and $SiO_2$.

To solve the problem described above, according to another aspect of the present invention, there is provided a designing method of a microlens array diffuser plate including a microlens group positioned on a surface of a transparent substrate, the designing method including: configuring the microlens group at least corresponding to a light ray entering part in the microlens array diffuser plate by two or more unit cells that are continuous in an array sequence, and causing the unit cells to include a plurality of microlenses positioned on the surface of the transparent substrate; causing the light ray entering part to have at least two regions having different average diffusion angles; and for a first region and a second region positioned closer to an end side of the light ray entering part than the first region in a manner that the second region is adjacent to the first region and having an average diffusion angle smaller than an average diffusion angle of the first region among the regions having different average diffusion angles, setting average radii of curvature of the unit cells that constitute the respective regions so as to satisfy a relational expression expressed by Expression (1) below.

In addition, to solve the problem described above, according to another aspect of the present invention, there is provided a display device including: the microlens array diffuser plate.

In addition, to solve the problem described above, according to another aspect of the present invention, there is provided a projection device including: the microlens array diffuser plate.

In addition, to solve the problem described above, according to another aspect of the present invention, there is provided a lighting device including: the microlens array diffuser plate.

$$\frac{1}{R_a} \leq \frac{1}{R_b} < \frac{2}{R_a} \qquad \text{Expression (1)}$$

Here, in Expression (1) above, $R_a$ is an average radius of curvature of a unit cell that constitutes the second region, and $R_b$ is an average radius of curvature of a unit cell that constitutes the first region.

According to the present invention as described above, it is possible to provide a diffuser plate, a designing method of the diffuser plate, a display device, a projection device, and a lighting device that can make the diffusion intensity uniform even in the case where light rays output from a light source having higher coherence enter.

DETAILED DESCRIPTION OF THE EMBODIMENT(S)

Figure 1:
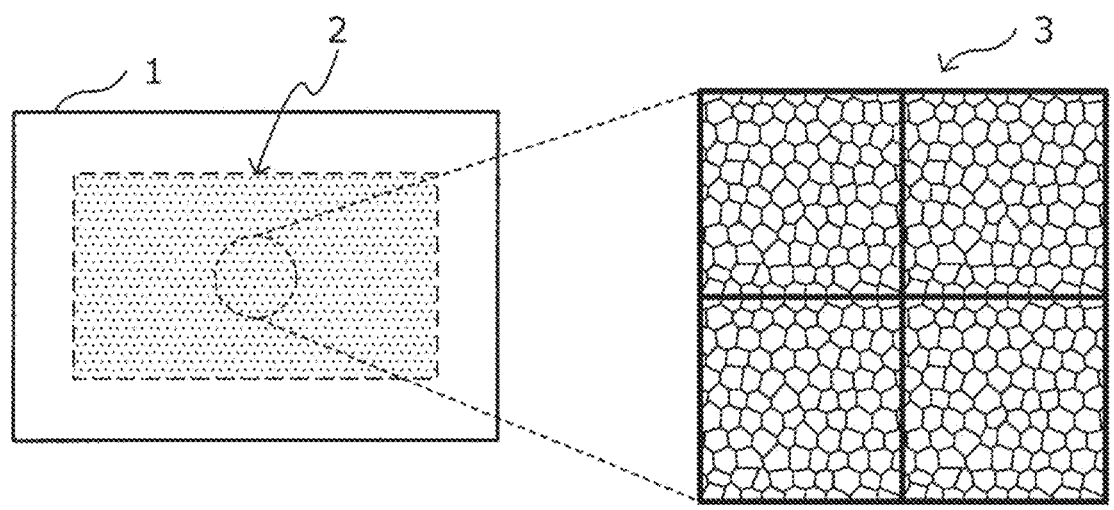
FIG. 1 is an explanatory diagram schematically illustrating a diffuser plate according to an embodiment of the present invention.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

(Diffuser Plate)

Figure 2:
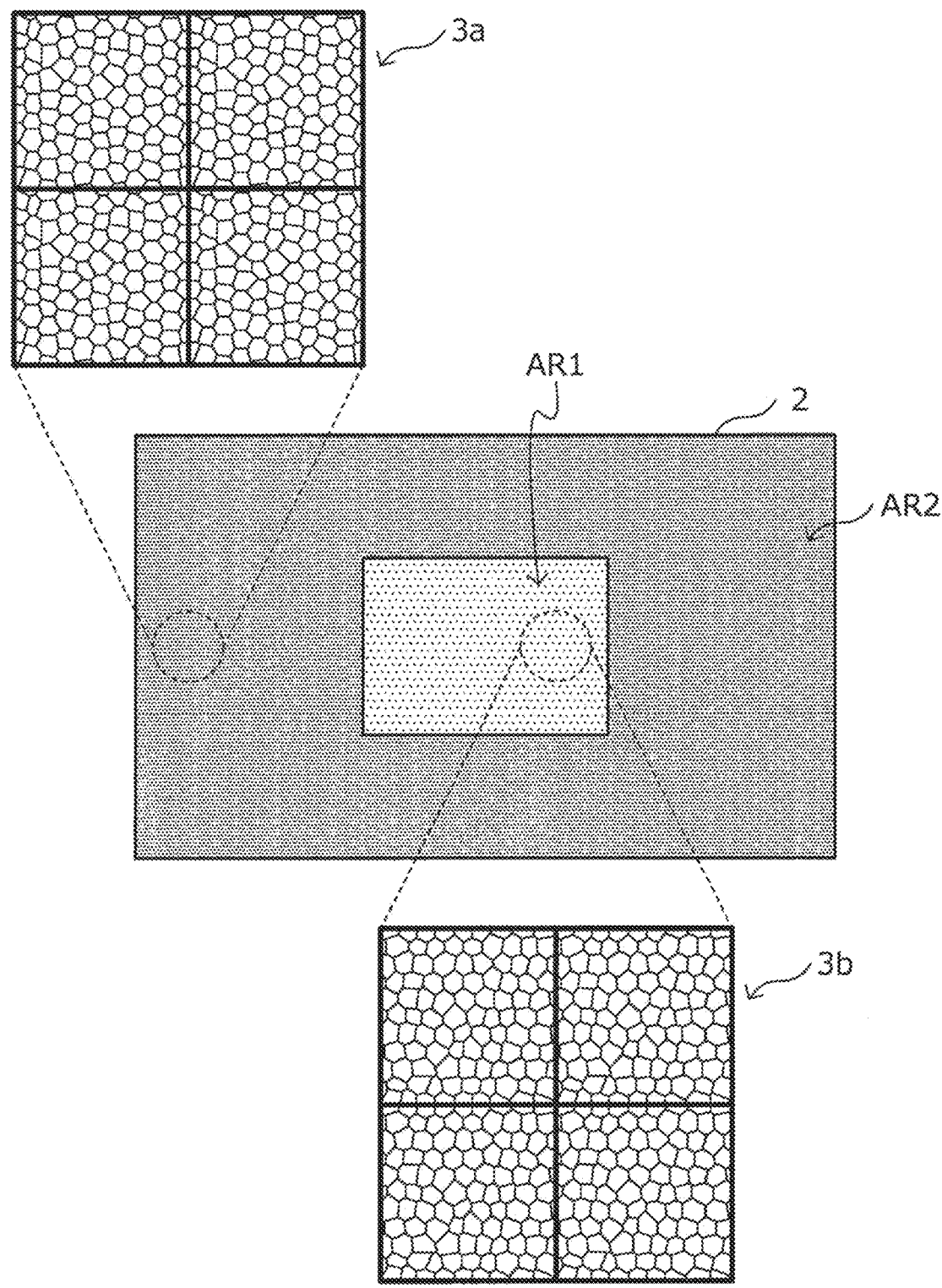
FIG. 2 is an explanatory diagram schematically illustrating a diffuser plate according to the embodiment.
Figure 3:
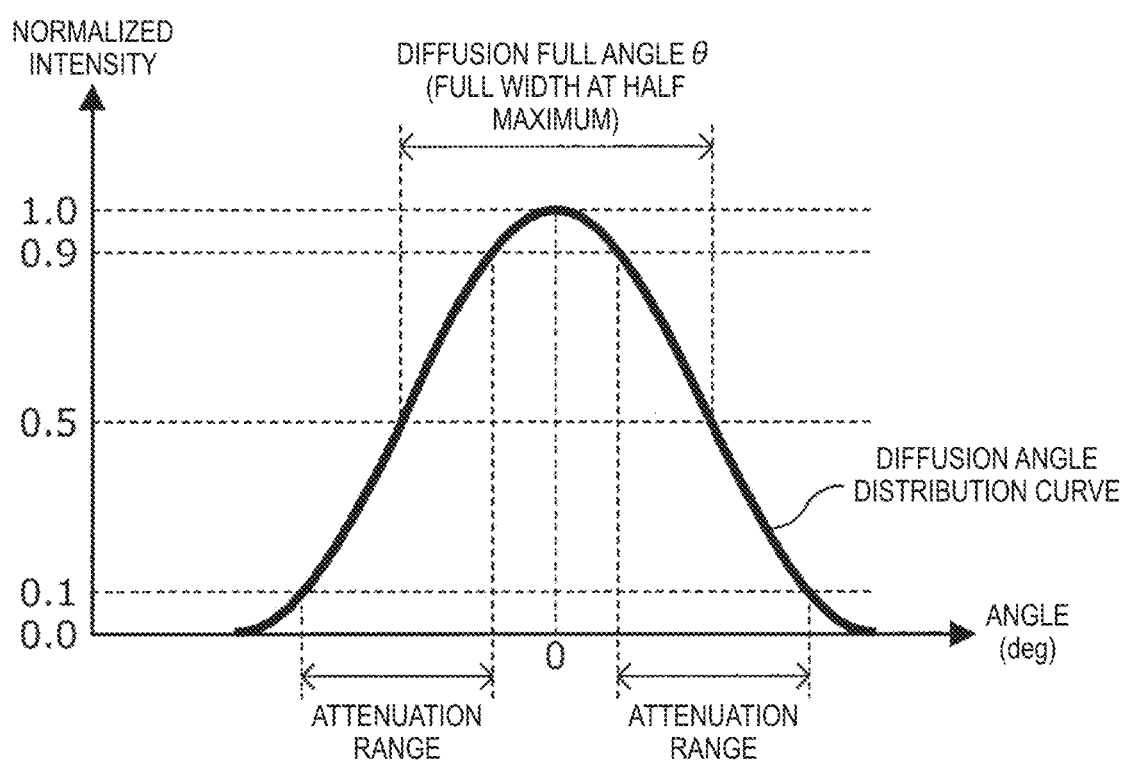
FIG. 3 is an explanatory diagram for describing uniformity of a diffused light intensity.
Figure 4:
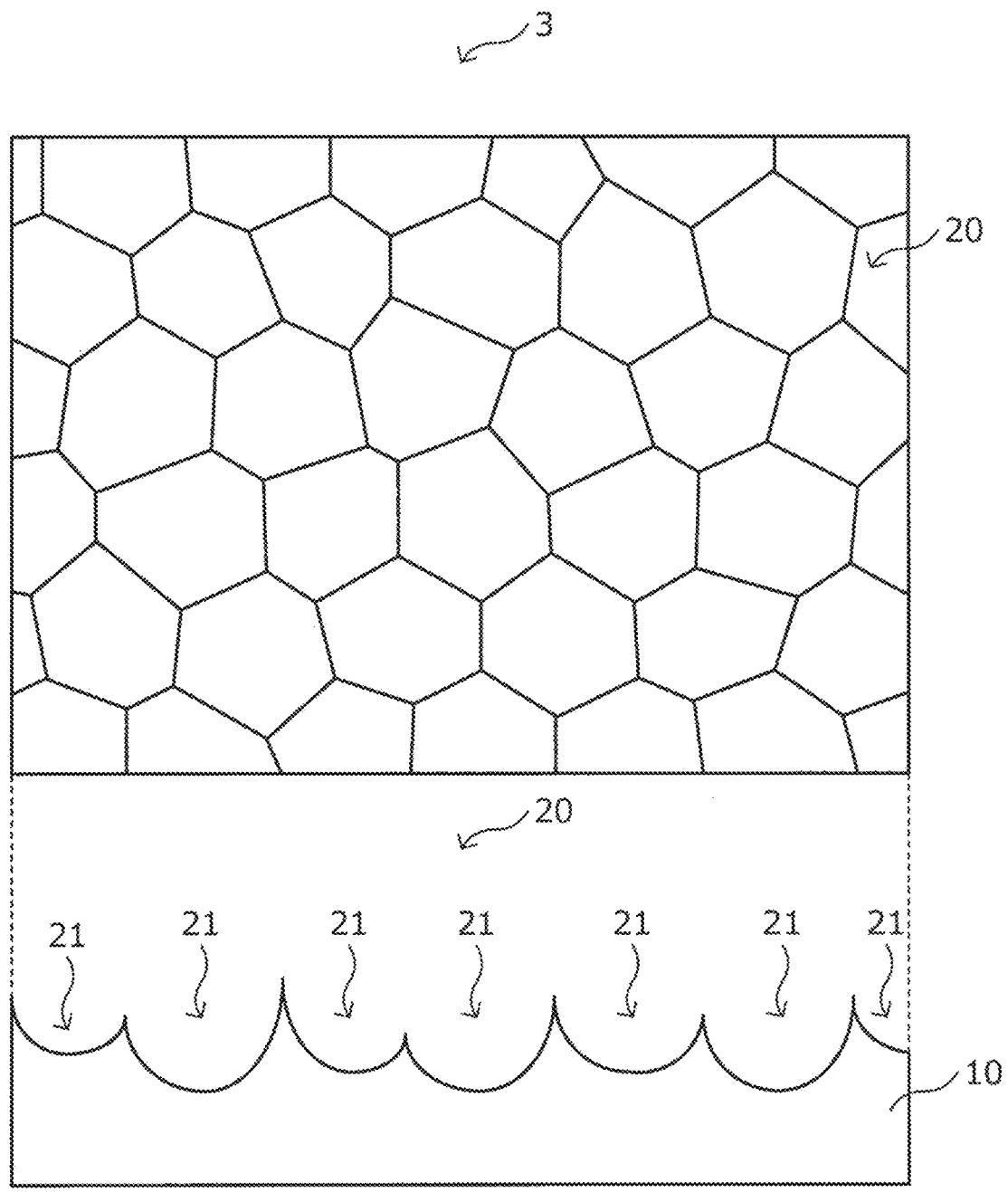
FIG. 4 is an explanatory diagram schematically illustrating part of unit cells that constitute the diffuser plate according to the embodiment.
Figure 6A:
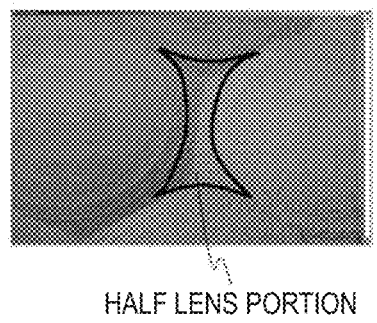
FIG. 6A is an explanatory diagram schematically illustrating examples of a state of a boundary between adjacent microlenses in a unit cell according to the embodiment.
Figure 6B:
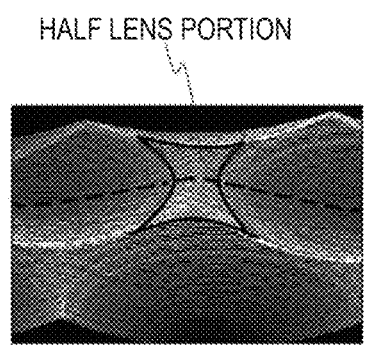
FIG. 6B is an explanatory diagram schematically illustrating examples of a state of a boundary between adjacent microlenses in a unit cell according to the embodiment.
Figure 7:
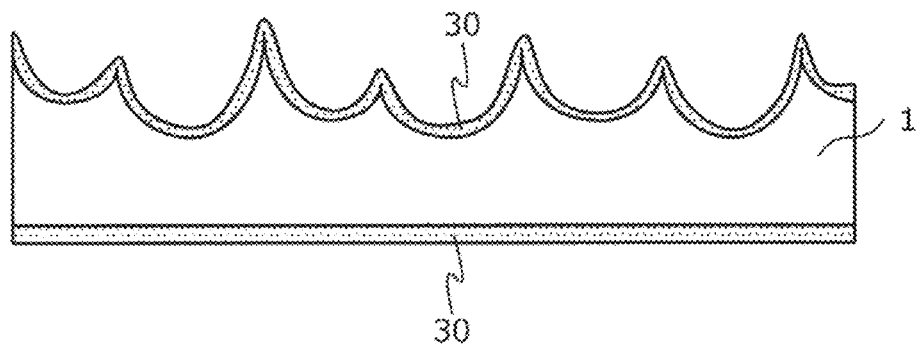
FIG. 7 is an explanatory diagram schematically illustrating a diffuser plate according to the embodiment.
Figure 8:
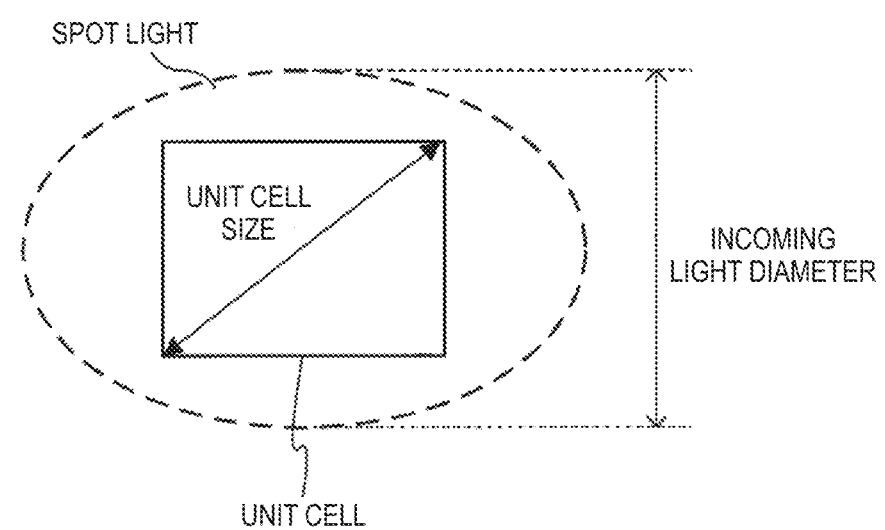
FIG. 8 is an explanatory diagram for describing location of unit cells in the diffuser plate according to the embodiment.
Figure 9:
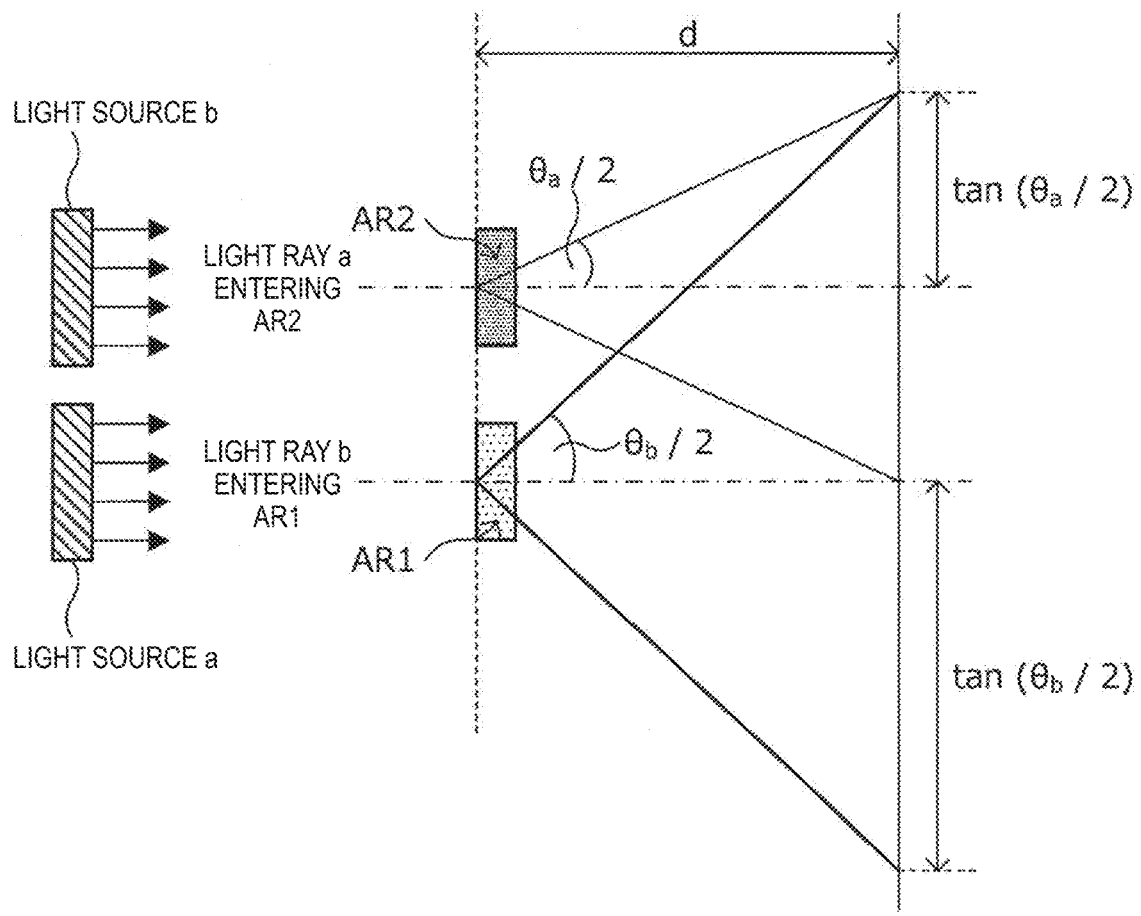
FIG. 9 is an explanatory diagram for describing average diffusion angles in the diffuser plate according to the embodiment.
Figure 10:
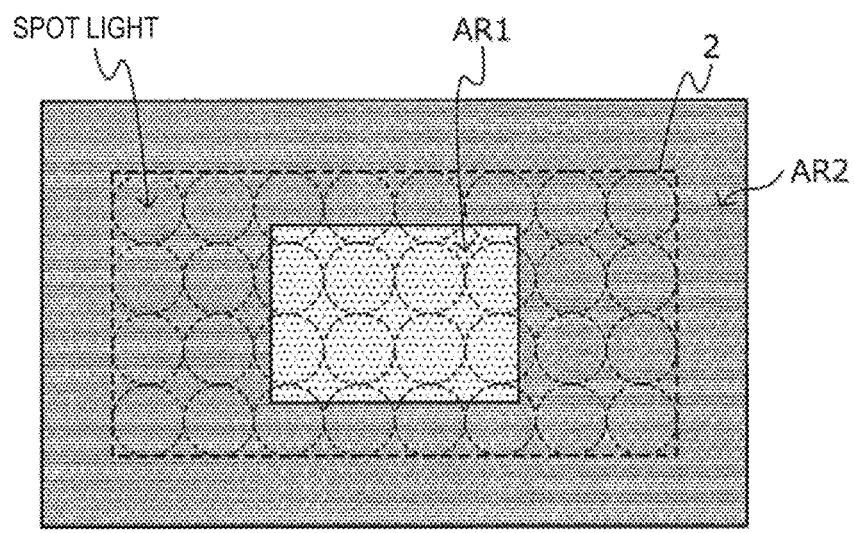
FIG. 10 is an explanatory diagram for describing location of partial regions in the diffuser plate according to the embodiment.
Figure 11:
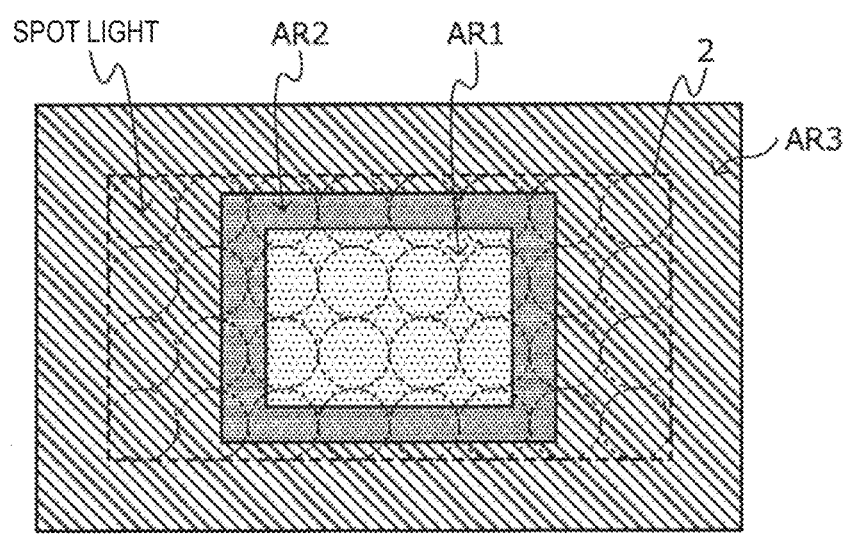
FIG. 11 is an explanatory diagram for describing location of partial regions in the diffuser plate according to the embodiment.
Figure 12:
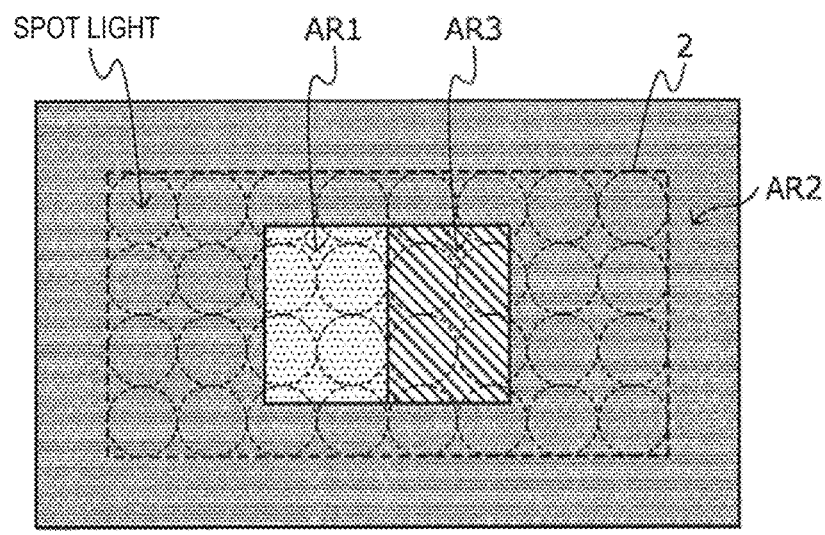
FIG. 12 is an explanatory diagram for describing location of partial regions in the diffuser plate according to the embodiment.

Hereinafter, a diffuser plate according to an embodiment of the present invention will be described in detail with reference to FIG. 1 to FIG. 12. FIG. 1, FIG. 2, and FIG. 7 are explanatory diagrams schematically illustrating the diffuser plate according to the present embodiment. FIG. 3 is an explanatory diagram for describing uniformity of a diffused light intensity. FIG. 4 is an explanatory diagram schematically illustrating part of unit cells that constitute the diffuser plate according to the present embodiment. FIG. 5A to FIG. 6B are explanatory diagrams schematically illustrating examples of a state of a boundary between adjacent microlenses in a unit cell according to the present embodiment. FIG. 8 is an explanatory diagram for describing location of unit cells in the diffuser plate according to the present embodiment. FIG. 9 is an explanatory diagram for describing an average diffusion angle in the diffuser plate according to the present embodiment. FIG. 10 to FIG. 12 are explanatory diagrams for describing location of partial regions in the diffuser plate according to the present embodiment.

The diffuser plate 1 according to the present embodiment is a microlens array diffuser plate in which a microlens group composed of a plurality of microlenses has been located on a substrate. In such a diffuser plate 1, at least a part 2 (hereinafter simply referred to as a "light ray entering part 2 as well") that light rays enter includes a plurality of unit cells 3 as schematically illustrated in FIG. 1. In addition, between the unit cells 3, a layout pattern (location pattern) of a plurality of microlenses provided in the unit cells 3 is continuous in the sequence direction of the unit cells (in other words, the array sequence direction), as schematically illustrated in the right diagram in FIG. 1.

Here, FIG. 1 presents an illustration using a case where the unit cells 3 that constitute the diffuser plate 1 have a rectangular shape as an example, whilst the shape of the unit cells 3 is not limited to that illustrated in FIG. 1, but should only be a shape that can fill a plane leaving no space, such as an equilateral triangular shape or a regular hexagonal shape, for example. In addition, in a region other than the light ray entering part 2 in the diffuser plate 1 illustrated in FIG. 1, a microlens group may be formed by the plurality of unit cells 3 similarly to the light ray entering part 2, or a microlens group may not be formed.

In addition, in the diffuser plate 1 according to the present embodiment, the light ray entering part 2 has at least two regions having different average diffusion angles, as schematically illustrated in FIG. 2. Hereinafter, such regions having predetermined average diffusion angles will be referred to as "partial regions AR".

In the light ray entering part 2 of the diffuser plate 1 according to the present embodiment, at least a first partial region AR1 which is a partial region having a predetermined average diffusion angle and a second partial region AR2 positioned closer to the end side of the light ray entering part 2 than the first partial region AR1 in a manner that the second partial region AR2 is adjacent to the first partial region AR1 and having an average diffusion angle smaller than the average diffusion angle in the first partial region AR1 exist, as schematically illustrated in FIG. 2. The average radius of curvature of the unit cells 3b that constitute the first partial region AR1 and the average radius of curvature of the unit cells 3a that constitute the second partial region AR2 respectively satisfy specific relational expressions which will be described below in detail.

Here, in the diffuser plate 1 according to the present embodiment, the number of the unit cells 3a, 3b that constitute the respective partial regions AR is not particularly limited, but it is preferable that the respective partial regions AR include at least two or more unit cells 3a, 3b. Within each of the partial regions AR, a layout pattern (location pattern) of a plurality of microlenses provided in the unit cells 3 is continuous in the sequence direction of the unit cells (in other words, the array sequence direction), and between two different partial regions AR, the layout pattern of a plurality of microlenses is also continuous in the sequence direction of the unit cells. That is, in the light ray entering part 2 of the diffuser plate 1 according to the present embodiment, the layout pattern of the plurality of microlenses is continuous in the sequence direction of the unit cells.

Since at least the light ray entering part 2 has at least two partial regions AR that satisfy conditions as will be described below in detail as illustrated in FIG. 2, the diffuser plate 1 according to the present embodiment can make the diffusion intensity uniform even in the case where light rays output from a light source having higher coherence, such as a laser array light source, for example, enter. Here, a uniform diffusion intensity refers to a situation in which both of two conditions which will be described below hold. First, as a first condition, a situation where, when measuring an intensity distribution pattern (diffusion angle distribution curve) of diffused light caused by the diffuser plate 1 according to the present embodiment, the number of peaks of the obtained intensity distribution pattern is one (the number of peaks recognized when taking a bird's eye view of the entire intensity distribution pattern of obtained diffused light is 1) can be mentioned, as schematically illustrated in FIG. 3, for example. In addition, as a second condition, a situation where, when assuming an average intensity (W/mm$^2$) of diffused light in a desired region as A and an intensity variation σ (W/mm$^2$) of diffused light in the desired region as B, the value of C=A/B which is the ratio between the average intensity and intensity variation is higher than the value of C in a diffuser plate having a diffusion angle identical to the diffusion angle of the diffuser plate 1 of interest and only including a single partial region AR can be mentioned. Here, the "desired region" when considering the above-described ratio C can be a region in which it is desired to increase the average intensity of diffused light and to make the intensity distribution uniform, for example. In addition, the "diffuser plate having a diffusion angle identical to the diffuser plate 1 of interest and only including a single partial region AR" can be a diffuser plate having a diffusion angle achieved by a partial region AR closest to the central portion among a plurality of diffusion angles achieved by the diffuser plate 1 of interest and only including a single partial region AR, for example.

FIG. 4 is an explanatory diagram schematically illustrating a structure of part of the unit cells 3 according to the present embodiment. As schematically illustrated in FIG. 4, the unit cells 3 that constitute each of the partial regions AR have a transparent substrate 10 and a microlens group 20 formed on a surface of the transparent substrate 10.

<Transparent Substrate 10>

The transparent substrate 10 is a substrate including a material that can be assumed as transparent in a wavelength band of light that enters the diffuser plate 1 according to the present embodiment. It is preferable that such a substrate is formed using an inorganic material having high light resistance. Examples of an inorganic material having high light resistance can include publicly-known optical glasses such as a quartz glass, a borosilicate glass, or a highly transmissive glass, whilst it is preferable to use a glass not containing $Al_2O_3$ or an alkaline component such as alkali metal (or with a content of the alkaline component of less than or equal to 20% by mass, more preferably less than or equal to 10% by mass). These glasses include a quartz glass, a borosilicate glass known as Tempax (registered trademark), and the like. By using such an inorganic material, it is possible to eliminate degradation in diffusion property of the diffuser plate that would be caused by an alteration in material even in the case of particularly using high-power laser light as incoming light. For example, in EAGLE (registered trademark) available from Corning Incorporated known as a non-alkali glass that contains a high $Al_2O_3$ content and does not contain an alkaline component, or the like, microscopic asperities of $Al_2O_3$ may occur in dry etching through use of a fluorinated gas during production of the diffuser plate, and transmittance may be reduced.

Note that, although FIG. 4 presents an illustration using the case where the transparent substrate 10 is rectangular as an example, the shape of the transparent substrate 10 is not limited to rectangle, but may have any shape in accordance with the shape of a display device, a projection device, a lighting device, or the like on which the diffuser plate 1 is mounted, for example.

<Microlens Group 20>

The microlens group 20 composed of a plurality of microlenses 21 is formed on a surface of the transparent substrate 10. Since an essential usage of the diffuser plate is to diffuse light, it is preferable for the microlenses 21 that constitute the unit cell 3 that a light outgoing surface entirely composed of concave lenses, as schematically illustrated at the bottom of FIG. 4. This is because, in the case where the light outgoing surface of the diffuser plate including convex lenses, a light collecting portion is created at a focal point, which can cause problems in installation restrictions and safety. In addition, in the microlens group 20 according to the present embodiment, the respective microlenses 21 are not identical in radius of curvature and vertex-to-vertex pitch, and have variations in a certain range, and thus, the focal length also has a certain distribution. In the case of concave lenses, the focal point becomes an imaginary point, whilst it is preferable that the focal point of each of the microlenses 21 is present in a region adjacent to the transparent substrate 10 that constitutes the diffuser plate 1 since the light intensity density is large at the focal point. This is because, in the case where the focal point of each of the microlenses 21 is present at a place away from the transparent substrate 10, restrictions on an optical system may occur, such as an inability to locate various components at the focal point.

In addition, in the microlens group 20 according to the present embodiment, the respective microlenses 21 that constitute the unit cell 3 are arranged so as to satisfy three conditions indicated below.

(1) The boundaries on the four sides of the unit cell 3 should be such that discontinuousness shall not occur in the pattern in the array sequence.

(2) The planar positions and height positions of vertices of the respective microlenses 21 (in other words, the lowest position of the depth of concave lenses) and the ridge lines between the microlenses 21 shall be made irregular such that diffraction is sufficiently suppressed.

(3) A non-lens region shall not exist between the adjacent microlenses 21 in order to suppress undiffused transmitted light.

Here, "irregular" mentioned in (2) above means that regularity concerning the location of the microlenses 21 does not exist practically, in an arbitrary region of the microlens group 20 in the diffuser plate 1. Thus, even if a certain kind of regularity exists in the location of the microlenses 21 at a microscopic region in an arbitrary region, the arbitrary region having no regularity in the location of the microlenses 21 as a whole is assumed to be determined as "irregular".

In the microlens group 20 according to the present embodiment located so as to satisfy the above-described three conditions, all the ridge lines between the microlenses 21 adjacent to each other are preferably nonparallel to each other and are nonparallel to the transparent substrate 10.

This is because, in the case where ridge lines parallel to each other exist between the microlenses 21, diffracted light components will be increased.

Here, the "ridge line" shall refer to a linear region, present in an adjacent lens boundary portion to which the plurality of microlenses 21 are adjacent, in which the radius of curvature of the microlenses 21 changes drastically. The width of such a ridge line is usually approximately smaller than or equal to the wavelength of light, and the width of this ridge line is controlled by a process condition such as etching such that diffracted light has an appropriate magnitude. In addition, "nonparallel" shall include a case where at least one of two lines to be determined whether they are parallel or not is a curve.

Figure 5A:
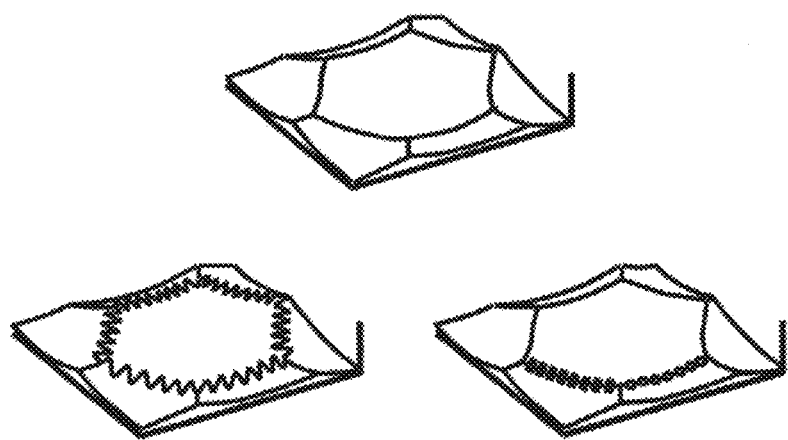
FIG. 5A is an explanatory diagram schematically illustrating examples of a state of a boundary between adjacent microlenses in a unit cell according to the embodiment.
Figure 5B:
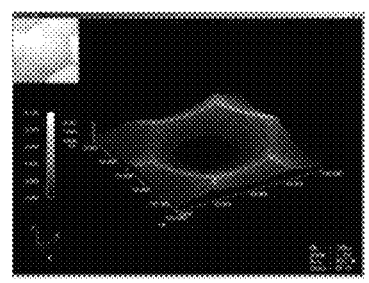
FIG. 5B is an explanatory diagram schematically illustrating examples of a state of a boundary between adjacent microlenses in a unit cell according to the embodiment.

Specifically, a microlens region surrounded by the adjacent microlenses 21 is a polygon as seen from the direction of an optical axis of the microlenses as illustrated in FIG. 5A and FIG. 5B, and each side of the polygon is preferably a curve as seen from a cross-section of the microlens.

In addition, it is preferable that the length of at least one of the sides of the unit cell 3 including the microlenses 21 that satisfy the above-described three conditions is an integer multiple of an average pitch of the microlenses 21 (for example, an average value of vertex-position-to-vertex-position distances of the respective microlenses 21) included in the unit cell 3. In other words, it is preferable that the cycle of the unit cells 3 in the diffuser plate 1 according to the present embodiment is a cycle in which the length of at least one of the sides of the unit cell 3 becomes an integer multiple of the average pitch of the microlenses 21.

In this manner, each of the adjacent microlenses 21 in the microlens group 20 is determined so as to satisfy the conditions as described above, and is not completely random.

Note that, for the ridge lines between the adjacent microlenses 21, it is possible to exercise further ingenuity in order to reduce diffracted light components. For example, it is also possible to make part of the ridge line have an irregular shape rather than a simple straight line or curve as schematically illustrated in FIG. 5A, and to locate a different shape such as a half lens portion on part of the ridge line as illustrated in FIG. 6A and FIG. 6B. Here, the half lens portion in the present embodiment refers to a region in which a change in radius of curvature of the microlenses 21 is relatively gentle such that the width of the ridge line becomes more than or equal to 10 μm. In addition, such a half lens portion also includes a half lens portion whose curvature has different signs in orthogonal directions like a saddle shape. By making the ridge lines between the microlenses 21 have a form as described above, it is possible to make the boundary portions between the microlenses 21 adjacent to each other non-flat to disturb the phase of a diffraction wavefront occurring at the ridge line portion, and to prevent diffracted light components in a specific direction from occurring.

In addition, it is preferable that the number of the microlenses 21 that constitute the unit cell 3 is 3×3=9 or more. This is derived from the fact that, in the case where incoming light equal in diameter to the unit cell 3 enters, the diffusion property does not change with respect to a displacement of an incoming light position if the average pitch of the microlenses 21 is approximately smaller than or equal to ⅓ of the incoming light diameter.

The above-described method of making the radius of curvature of each of the microlenses 21, planar positions and height positions of vertices, vertex-to-vertex pitch, ridge line between the microlenses 21, and the like irregular is not particularly limited, but it is sufficient if a publicly-known method as disclosed in the above-described JP 2017-83815A, for example, is used as appropriate.

In addition, conditions concerning the average diffusion angle that each of the partial regions AR should satisfy will be described below again in detail.

<Antireflection Layer>

An antireflection layer 30 may be formed on a front surface and a rear surface of the diffuser plate 1 according to the present embodiment (in other words, a surface of the microlenses 21 and a surface of the transparent substrate 10 at a side where the microlens group 20 is not arranged) for the purpose of increasing transmittance and preventing reflection stray light or the like, as schematically illustrated in FIG. 7.

It is possible to form such an antireflection layer 30 by using a general dielectric such as $SiO_2$, $Al_2O_3$, $MgF_2$, $CeO_2$, $TiO_2$, $Ta_2O_5$, $Nb_2O_5$, $Y_2O_3$, $Tb_2O_3$, ZnS, or $ZrO_2$, for example, by a publicly-known method such as vapor deposition or sputtering. Here, by forming the antireflection layer 30 using a material having high light resistance, such as $Ta_2O_5$, $Nb_2O_5$, or $SiO_2$, for example, even if incoming light is light having a high optical density, such as high-power laser, it is possible to produce sufficient effects without degradation by such light. On this occasion, by forming the antireflection layer 30 as a multilayered structure in which materials having high light resistance, such as $Ta_2O_5$, $Nb_2O_5$, and $SiO_2$, for example, are laminated one upon another, it is possible to achieve still higher light resistance. The film thickness of such an antireflection layer 30 is not particularly limited, but may be appropriately set depending on the use of the diffuser plate 1, the optical density of incoming light, and the like.

Note that, when forming the antireflection layer 30 on the diffuser plate 1, the film thickness of the antireflection layer 30 may differ at the central portion and the peripheral portion of the microlenses 21 due to the presence of unevenness of the microlenses 21 at the surface of the diffuser plate 1, and thus, it is preferable to form the antireflection layer 30 taking this into consideration. In addition, since the incoming angle of incoming light differs at the central portion and the peripheral portion of the microlenses 21, it is more preferable to exercise ingenuity such as taking an assumed angular range wider than usual by design.

<Size of Unit Cells>

When actually manufacturing the microlens array, producing a photomask or mold for transfer is considered. In this case, in general, formation of the shapes of the microlenses 21 is often performed by direct drawing with laser or an electron beam, whilst in order to reduce the amount of data to be produced, a technique like the so-called step and repeat that repeats the unit cell 3 having a relatively small area vertically and horizontally to form an array sequence and enlarges the array sequence to a desired size is also often adopted. When light enters a microlens array having such an array structure, two types of diffracted light components composed of double repetition structures, one within the unit cells 3 and the other between the unit cells 3, will be produced. With respect to each diffraction angle, the diffraction angle within the unit cells 3 is determined by the pitch of the lens location, and the diffraction angle between the unit cells 3 is determined by the sizes of the unit cells 3.

As is conventionally known, when light enters a cyclic repetition structure, diffracted light occurs. When expressing the pitch of the repetition structure (repetition cycle) as p, a diffraction order (integer) as m, and the wavelength of incoming light as λ, a diffraction angle θ is given by Expression 101 below.

$$\theta = \sin^{-1}\frac{m\lambda}{p} \qquad \text{(Expression 101)}$$

The diffraction angle resulting from the unit cell array (the diffraction angle between the unit cells 3) is considered. For example, when assuming the pitch of the unit cell as 700 μm and the wavelength of incoming light as 450 nm, the angle (half angle) of first order diffracted light (diffracted light in the case where m=1) is 0.03 degree according to Expression (101) above. Consequently, even in the case where the diffusion angle (half angle) of the diffuser plate is approximately 3 degrees, $(3/0.03)^2 = 10^4$ rays of diffracted light will occur in diffused light. Since the intensity of diffracted light rapidly decreases as the diffraction order m becomes higher (for example, when the diffraction order is m, the peak intensity becomes $(2/\pi)^m$), approximately several tens of diffraction peaks will appear in the diffused light, actually. Hereinbelow, such diffracted light resulting from the unit cell array will be referred to as sub-diffracted light.

On the other hand, each of luminescent spots in diffracted light through the lens array (in other words, each of luminescent spots in diffracted light obtained by diffraction within the unit cells 3) are separated further discretely by sub-diffraction peaks obtained by the unit cell array as described above. Consequently, clarity of luminescent spots in the diffused light will be reduced by such sub-diffracted light peaks.

Here, since the diffraction angle obtained by the unit cells is very small, luminescent spots of the sub-diffraction component do not raise any problem in actual use of the diffuser plate 1 according to the present embodiment. Consequently, by causing sub-diffracted light obtained by the unit cells 3 to occur appropriately, it is possible to reduce the peak intensity of main diffracted light.

The intensity of sub-diffracted light is determined by the relationship between the unit cells 3 and the magnitude of incoming light. In the case where the unit cell 3 is larger than incoming light, sub-diffracted light resulting from the cyclic structure of the unit cells 3 will not occur in general. Here, considering the full width at half maximum in the distribution pattern of incoming light intensity, the diameter in a direction in which such a full width at half maximum is minimized is defined as an "incoming light diameter" as illustrated in FIG. 8, and the unit cell 3 is assumed as being rectangular such as a rectangle or a square, and the length of the diagonal line of the unit cells 3 is defined as a "unit cell size". On this occasion, if the unit cell size is smaller than the incoming light diameter as illustrated in FIG. 8, sub-diffracted light resulting from diffraction between the unit cells 3 occurs, and it is possible to reduce the peak intensity of main diffracted light resulting from the lens array (in other words, resulting from diffraction within the unit cells 3).

Here, even if light that enters the diffuser plate 1 is a collection of spot light rays output from a plurality of laser light sources, it is considered that the incoming light diameter as illustrated in FIG. 8 is at most approximately 3 mm. Consequently, if the unit cell size as illustrated in FIG. 8 is smaller than or equal to 3 mm, it is possible to use the diffuser plate 1 according to the present embodiment for any laser light source.

As described above, the microlens array diffuser plate 1 according to the present embodiment includes two or more unit cells 3, and each of the unit cells 3 has the microlens group 20 composed of the plurality of microlenses 21. In addition, it is characterized in that the microlenses 21 included in each of the unit cells 3 are continuously set in array. Further, it is characterized in that at least the light ray entering part 2 has at least two partial regions AR that satisfy predetermined conditions as will be described below in detail. Accordingly, even in the case where light rays output from a light source having higher coherence, such as a laser array light source, for example, enter, the diffuser plate 1 according to the present embodiment can make the diffusion intensity uniform.

<Relational Expressions that Respective Partial Regions AR should Satisfy>

As described earlier, the light ray entering part 2 of the diffuser plate 1 according to the present embodiment has at least two partial regions AR having average diffusion angles different from each other. In such partial regions AR, the first partial region AR1 is positioned at the central portion of the light ray entering part 2, and the second partial region AR2 having an average diffusion angle smaller than the first partial region is positioned to surround the first partial region AR1, as schematically illustrated in FIG. 2, for example.

The first partial region AR1 and the second partial region AR2 have average diffusion angles different from each other (in more detail, the relation of the average diffusion angle in the first partial region AR1>the average diffusion angle in the second partial region AR2 holds), and such a difference in average diffusion angle is achieved by causing the unit cells 3a, 3b constituting the respective partial regions to have different average radii of curvature.

A radius of curvature R of the microlenses 21 constituting the unit cells 3 can be expressed as in Expression 103 below as a function of a refractive index n of the transparent substrate 10, a magnitude θ of a diffusion angle to be achieved, and a pitch p of the microlenses 21.

$$R(n, \theta, p) = \frac{p \cdot (n-1)}{2\sin\frac{\theta}{2}} \quad \text{(Expression 103)}$$

In addition, in the diffuser plate 1 according to the present embodiment, since various changing tolerances represented by a pitch changing range Δp concerning the pitch p of the microlenses 21 and including a lens-vertex-height changing range Δh and the like are set, and their values are made nonuniform, the radius of curvature R of the microlenses 21 given by Expression 103 above is also made nonuniform within a certain radius-of-curvature changing range ΔR to have an average value in accordance with the radius-of-curvature changing range ΔR.

Relational expressions that the average radius of curvature of the unit cells 3b that constitute the first partial region AR1 and the average radius of curvature of the unit cells 3a that constitute the second partial region AR2 should satisfy will be described below with reference to FIG. 9.

As schematically illustrated in FIG. 9, in order to cause a light ray output from the light source to enter the diffuser plate 1 to make the intensity of diffused light uniform at a place spaced away from the diffuser plate 1 by a desired distance d, it is necessary to set the average diffusion angle of each of the partial regions such that the diffusion angle of a light ray from a light source a entering the first partial region AR1 and the diffusion angle of a light ray from a light source b entering the second partial region AR2 do not completely overlap each other.

At this time, the case where a light ray b from the light source b enters the first partial region AR1 of the diffuser plate 1 and a light ray a from the light source a enters the second partial region AR2 is considered. On this occasion, assuming the average diffusion angle of the unit cells 3b that constitute the first partial region AR1 as $\theta_b$, and the average diffusion angle of the unit cells 3a that constitute the second partial region AR2 as $\theta_a$, these two average diffusion angles $\theta_a$, $\theta_b$ need to satisfy a relational expression expressed by Expression 201 below.

Here, since Expression 203 below is derived from Expression 103 above, Expression 201 indicated below can be deformed as Expression 205 below using the relation of Expression 203. Here, in Expression 205 below, $R_a$ is the average radius of curvature of the unit cells 3a that constitute the second partial region AR2, and $R_b$ is the average radius of curvature of the unit cells 3b that constitute the first partial region AR1.

$$\tan\frac{\theta_a}{2} \leq \tan\frac{\theta_b}{2} < 2\tan\frac{\theta_a}{2} \quad \text{Expression (201)}$$

$$\tan\frac{\theta}{2} = \frac{p \cdot (n-1)}{R} \quad \text{Expression (203)}$$

$$\frac{p \cdot (n-1)}{R_a} \leq \frac{p \cdot (n-1)}{R_b} < \frac{2p \cdot (n-1)}{R_a} \quad \text{Expression (205)}$$

Since, in the diffuser plate 1 according to the present embodiment, the transparent substrate 10 is common, and the average pitch p of the microlenses 21 is constant, Expression 207 indicated below is derived from Expression 205 above.

$$\frac{1}{R_a} \leq \frac{1}{R_b} < \frac{2}{R_a} \quad \text{Expression (207)}$$

When the average radius of curvature $R_b$ of the unit cells 3b that constitute the first partial region AR1 and the average radius of curvature $R_a$ of the unit cells 3a that constitute the second partial region AR2 satisfy the relational expression expressed by Expression 207 above, the average diffusion angle $\theta_b$ in the first partial region AR1 and the average diffusion angle $\theta_a$ in the second partial region AR2 differ from each other. As a result, diffused light from the partial regions AR adjacent to each other, such as the first partial region AR1 and the second partial region AR2, no longer overlap each other completely, and the diffusion intensity can be made uniform even in the case where light rays output from a light source having higher coherence enter.

Note that the relational expression expressed by Expression 207 above is a relational expression that a certain partial region AR(N) (N≥2) and a partial region AR(N+1) positioned closer to the end side of the light ray entering part 2 than the partial region AR(N) in a manner that the partial region AR(N+1) is adjacent to this partial region AR(N) should satisfy, and also holds in the case where the number of partial regions becomes more than or equal to three.

<Size of Each Partial Region AR>

In recent years, a laser array light source often used as a light source for a display device, a projection device, and a lighting device is obtained by arranging a plurality of laser diodes capable of outputting laser light having high coherence in a grid, and light rays output from such a light source is a collection of spot light rays output from the respective laser diodes. Hereinafter, description will be given paying attention to the case where a collection of spot light rays output from such a plurality of light sources enters the diffuser plate 1 according to the present embodiment.

In the light ray entering part 2 of the diffuser plate 1 according to the present embodiment, it is preferable that the first partial region AR1 and the second partial region AR2 are located such that the outer periphery of the first partial region AR1 is positioned on the inner side of a region of projection (that is, the light ray entering part 2) of a collection of spot light onto the diffuser plate 1 and the outer periphery of the second partial region AR2 is positioned on the outer side of the region of projection (the light ray entering part 2), as schematically illustrated in FIG. 10, for example. By adopting the location as illustrated in FIG. 10, the diffusion intensity can be made uniform more reliably even in the case where light rays output from a light source having higher coherence enter.

In addition, in the light ray entering part 2 of the diffuser plate 1 according to the present embodiment, it is preferable that the area of the first partial region AR1 is more than or equal to 0.04% and less than or equal to 85% of the area of a region used as the diffuser plate 1, and more than or equal to 0.05% and less than or equal to 92% of the area of the light ray entering part 2. By causing the area of the first partial region AR1 to fall within the above-described range, the diffusion intensity can be made uniform still more reliably. Note that the above-described two types of area rates of the first partial region AR1 are based on the knowledge obtained by the inventors of the present invention verifying diffusion properties of the diffuser plate 1 achieved while variously changing the combination of the area of the first partial region AR1, the area of the light ray entering part 2, and the area of the region used as the diffuser plate 1, and analyzing an obtained result.

In addition, the relation concerning the size of each of the partial regions AR as illustrated in FIG. 10 also applies similarly to the case where three or more partial regions AR exist in the light ray entering part 2. As illustrated in FIG. 11, for example, in the case where the first partial region AR1 to a third partial region AR3 exist in the light ray entering part 2, it is preferable that the outer periphery of at least one region among the three regions is positioned on the outer side of the region of projection (that is, the light ray entering part 2) of a collection of spot light rays onto the diffuser plate 1.

Here, in the case where N+1 (N≥2) partial regions AR exist in the light ray entering part 2, which of the partial regions AR has the outer periphery positioned on the outer side of the light ray entering part 2 is not particularly limited, but it is sufficient if it is determined as appropriate in accordance with a required degree of uniformity of the intensity of diffused light.

The size of each of the partial regions AR according to the present embodiment has been described above in detail.

Note that the above description has paid attention to the case where the shape defined by the outer periphery of each of the partial regions AR is rectangular, whilst the shape defined by the outer periphery of each of the partial regions AR is not limited to rectangle, but may be polygonal, circular, or elliptical, and it is sufficient if it is determined as appropriate in accordance with a projection shape created by a collection of light rays output from a light source of interest.

In addition, FIG. 10 and FIG. 11 illustrate, as examples, the cases where the second partial region AR2 exists to surround the first partial region AR1, and the third partial region AR3 exists to surround the second partial region AR2, whilst the location state of each of the partial regions AR is not limited to those illustrated in FIG. 10 and FIG. 11. As illustrated in FIG. 12, for example, the first partial region AR1 and the third partial region AR3 may be adjacent to each other, and the second partial region AR2 may exist to surround the first partial region AR1 and the third partial region AR3.

The diffuser plate 1 according to the present embodiment has been described above in detail with reference to FIG. 1 to FIG. 12.

(Designing Method of Diffuser Plate)

Subsequently, a designing method of a diffuser plate according to the present embodiment will be described briefly.

The designing method of a diffuser plate according to the present embodiment is a designing method of a microlens array diffuser plate including a microlens group positioned on the surface of the transparent substrate 10.

In the designing method of a diffuser plate according to the present embodiment, a microlens group at least corresponding to the light ray entering part 2 in the diffuser plate 1 shall include two or more unit cells which are continuous in the array sequence, and the unit cells 3 are designed so as to include a plurality of microlenses 21 positioned on the surface of the transparent substrate 10.

On this occasion, the light ray entering part 2 shall have at least two partial regions AR having different average diffusion angles as described earlier. In more detail, with regard to the first partial region AR1 and the second partial region AR2 positioned closer to the end side of the light ray entering part 2 than the first partial region AR1 in a manner that the second partial region AR2 is adjacent to the first partial region AR1 and having an average diffusion angle smaller than the average diffusion angle in the first partial region AR1 among the partial regions having different average diffusion angles, it is sufficient if the average radii of curvature of the unit cells 3a, 3b constituting the respective regions are set to satisfy the relational expression expressed by Expression 207 above.

Here, a more detailed designing method of the respective unit cells 3a, 3b is not particularly limited, but it is possible to adopt a publicly-known designing method, and the designing method as disclosed in the above-described JP 2017-83815A, for example, can be adopted.

By designing the structure of the light ray entering part 2 of the diffuser plate 1 in the foregoing manner, the diffuser plate 1 according to the present embodiment can be designed.

(Manufacturing Method of Diffuser Plate)

Subsequently, a manufacturing method of a diffuser plate according to the present embodiment will be described briefly.

The manufacturing method of the diffuser plate 1 according to the present embodiment is not particularly limited, but a publicly-known method can be utilized for manufacturing. For example, it is possible to apply various dry etching processes to the diffuser plate 1 designed in conformity with the above-described designing method. A specific manufacturing method is not particularly limited, but the manufacturing method disclosed in the above-described JP 2017-83815A, for example, can be utilized.

(Application Examples of Diffuser Plate)

Next, application examples of the diffuser plate 1 according to the present embodiment will be described briefly.

The diffuser plate 1 according to the present embodiment described above is provided as appropriate in a device that needs to diffuse the light to achieve its function. The device that needs to diffuse the light to achieve its function is a display device such as various types of displays, a projection device such as a projector, and the like, for example.

In addition, the diffuser plate 1 according to the present embodiment can also be used for optical shaping application. Further, the diffuser plate 1 according to the present embodiment can also be applied to various lighting devices.

Also, the device that needs to diffuse the light to achieve its function is not limited to the above examples, and the diffuser plate 1 according to the present embodiment can be applied to other publicly known devices, as long as it is a device that utilizes diffusion of light.

EXAMPLE

Next, the diffuser plate according to the present invention will be described in detail, with Examples and Comparative Examples. Note that the Examples described below are mere examples of the diffuser plate according to the present invention, and the diffuser plate according to the present invention is not limited to the following examples.

Experimental Example 1

In the present experimental example, regarding an optical system in which a light source and the diffuser plate 1 having the first partial region AR1 and the second partial region AR2 are used, the intensity distribution of diffused light obtained by the diffuser plate was simulated using publicly-known simulation software. The software used for such simulation is Optic Studio (available from Zemax LLC) which is commercially-available illumination design simulation software.

Figure 13:
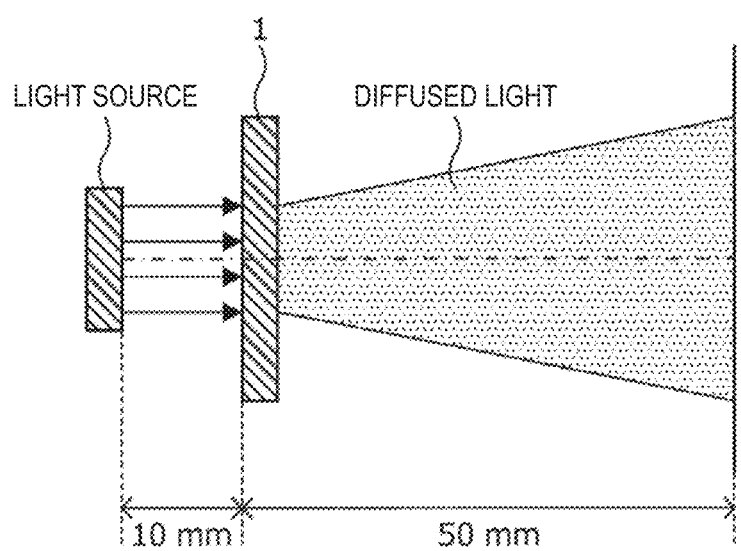
FIG. 13 is an explanatory diagram for describing setting conditions in Experimental example 1.

A schematic view of the optical system for which the simulation was performed is illustrated in FIG. 13. As illustrated in FIG. 13, in the present simulation, the diffuser plate 1 was located at a position spaced apart from a light source having a configuration as illustrated in FIG. 14 by 10 mm, and the intensity distribution of diffused light at a position spaced apart from the diffuser plate 1 by 50 mm was simulated.

Figure 14:
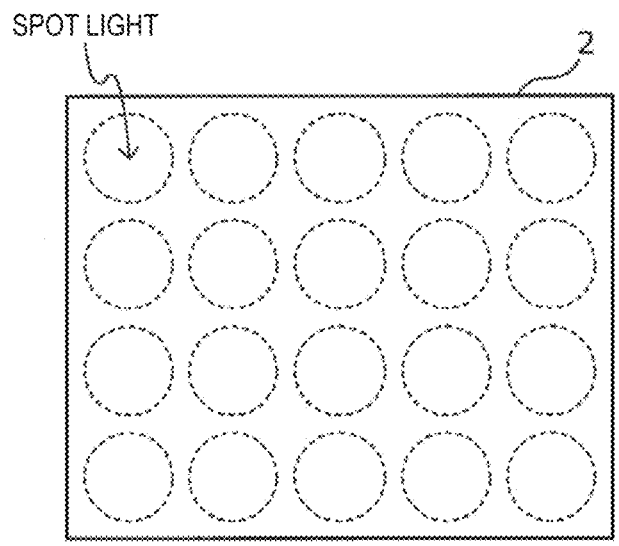
FIG. 14 is an explanatory diagram for describing setting conditions in Experimental example 1.

As schematically illustrated in FIG. 14, light sources of interest were implemented by light sources capable of outputting spot light (parallel light) having a diameter of 8 mm, arrayed in four columns and five rows at intervals of 1 mm. With such arrayed light sources, the light ray entering part 2 as illustrated in FIG. 14 occurs in the entering surface of the diffuser plate 1.

Figure 15:
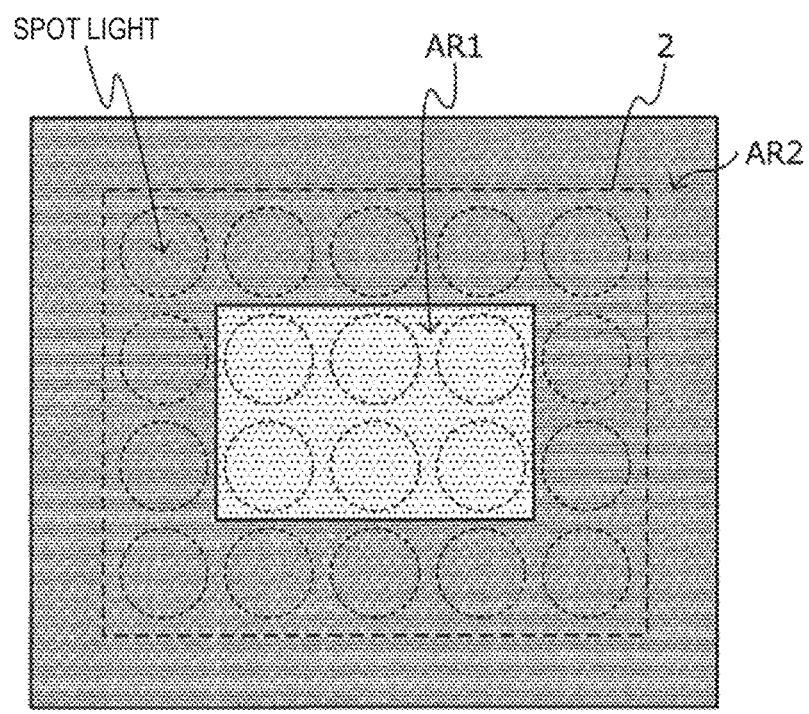
FIG. 15 is an explanatory diagram for describing setting conditions in Experimental example 1.

The positional relation between the diffuser plate 1 used in the simulation as described above and the light ray entering part 2 is schematically illustrated in FIG. 15. As illustrated in FIG. 15, in the present experimental example, attention was paid to the case of providing the first partial region AR1 having the average diffusion angle $\theta_b$ at the central portion of the diffuser plate 1 and the second partial region AR2 having the average diffusion angle $\theta_a$ in a manner that the second partial region AR2 surrounds the first partial region AR1.

The first partial region AR1 was located to overlap two columns and three rows at the central part among the light sources in four columns and five rows, as schematically illustrated in FIG. 15. The first partial region AR1 in such a diffuser plate is a 2 mm×3 mm region at the central part. In addition, in the present experimental example, the average diffusion angle $\theta_b$ in the first partial region AR1 was set constant at 9°, using the full angle at half maximum. At this time, the value of $1/R_b$ is 0.004.

In addition, the second partial region AR2 was located to overlap light sources existing at the outer periphery of the central part of the light sources, as schematically illustrated in FIG. 15. The second partial region in such a diffuser plate is a portion excluding the 2 mm×3 mm region at the central part corresponding to the first partial region AR1 in the 5 mm×6 mm region.

That is, in the present experimental example, the area (6 mm$^2$) of the first partial region AR1 is 20% of the area (30 mm$^2$) of the region used as the diffuser plate, and 30% of the area (20 mm$^2$) of the light ray entering part 2. In addition, in the present experimental example, the unit cells 3a, 3b constituting the respective partial regions AR each have a diagonal line having a length of 1.023 mm.

In the present experimental example, the intensity distribution of obtained diffused light was simulated while changing the average diffusion angle $\theta_a$ in the second partial region AR2 (the average radius of curvature $R_a$ in the second partial region AR2) as indicated in Table 1 below. Here, it was assumed that the diffuser plate 1 had a refractive index n equal to 1.48, and the average pitch p of the microlenses 21 in the respective unit cells 3a, 3b was set constant at 82 μm.

TABLE 1

| No. | θa (deg) | θa/2 (rad) | Ra (μm) | 1/Ra | 2/Ra | Average intensity A (W/mm$^2$) | Variation B (W/mm$^2$) | Ratio C | Notes |
|---|---|---|---|---|---|---|---|---|---|
| 1 | 2 | 0.017 | 1128 | 0.00089 | 0.00177 | 0.512 | 0.186 | 2.75 | Comparative example |
| 2 | 3 | 0.026 | 752 | 0.00133 | 0.00266 | 0.461 | 0.136 | 3.39 | Comparative example |
| 3 | 4 | 0.035 | 564 | 0.00177 | 0.00355 | 0.410 | 0.099 | 4.14 | Comparative example |
| 4 | 5 | 0.044 | 451 | 0.00222 | 0.00443 | 0.364 | 0.078 | 4.67 | Example |
| 5 | 6 | 0.052 | 376 | 0.00266 | 0.00532 | 0.321 | 0.070 | 4.59 | Example |
| 6 | 7 | 0.061 | 322 | 0.00311 | 0.00621 | 0.284 | 0.064 | 4.44 | Example |
| 7 | 8 | 0.070 | 282 | 0.00355 | 0.00709 | 0.255 | 0.059 | 4.32 | Example |
| 8 | 9 | 0.079 | 250 | 0.00400 | 0.00800 | 0.230 | 0.054 | 4.26 | Comparative example |
| 9 | 10 | 0.087 | 225 | 0.00444 | 0.00889 | 0.210 | 0.049 | 4.29 | Comparative example |
| 10 | 11 | 0.096 | 204 | 0.00490 | 0.00980 | 0.193 | 0.046 | 4.20 | Comparative example |

Figure 16:
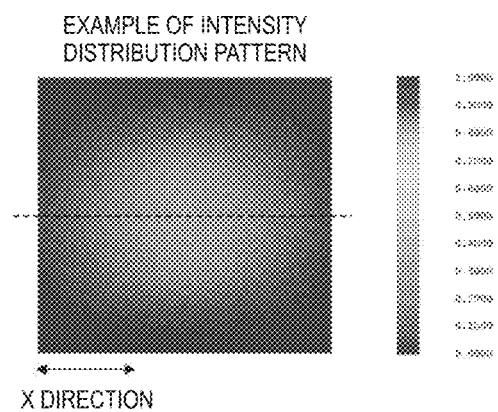
FIG. 16 is an explanatory diagram illustrating an example of an intensity distribution pattern of diffused light in Experimental example 1.
Figure 17:
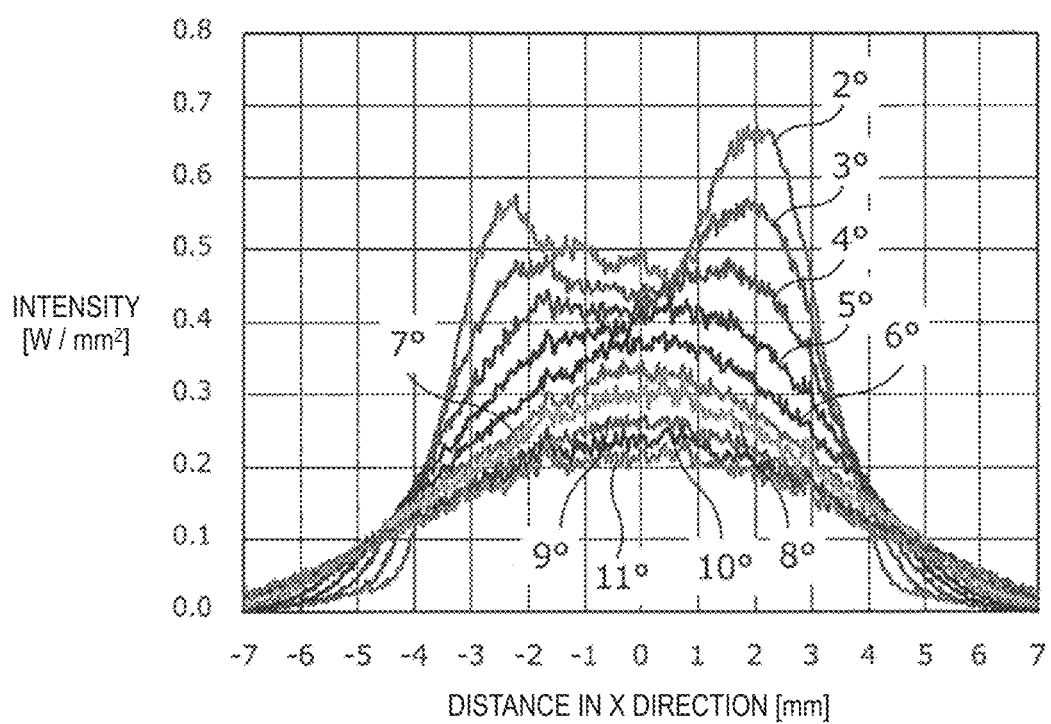
FIG. 17 is a graph illustrating an intensity distribution pattern of diffused light in Experimental example 1.

Through the simulation as described above, an intensity distribution pattern of diffused light as illustrated in FIG. 16, for example, can be obtained. Among the conditions shown in Table 1 above, intensity distribution patterns of diffused light in the cases where $\theta_a = 2°$ to $11°$ are also illustrated in FIG. 17. Note that the horizontal axis in FIG. 17 corresponds to a horizontal distance (using the center of the intensity distribution pattern as the origin) of the intensity distribution pattern as illustrated in FIG. 16, and the vertical axis in FIG. 17 indicates the intensity in the case where the intensity distribution pattern as illustrated in FIG. 16 is cut at the central part in the vertical direction.

As is clear from FIG. 17, it is understood that, in the cases where $\theta_a = 2°$, $3°$, and $4°$, the relationship expressed by Expression 207 above is not satisfied, and the number of peaks in the intensity distribution pattern becomes two, as a result of which the intensity of diffused light is not uniform. This is considered as a result that light diffused in the first partial region AR1 and light diffused in the second partial region AR2 reinforce each other.

On the other hand, it is understood that, in the cases where $\theta_a = 5°$, $6°$, $7°$, $8°$, and $9°$, the relationship expressed by Expression 207 above is satisfied, and the number of peaks in the intensity distribution pattern is one.

Note that, in the cases where $\theta_a = 10°$ and $11°$, the number of peaks in the intensity distribution pattern is one although not illustrated in FIG. 17, but the relationship expressed by Expression 207 above is not satisfied.

From the above-described verification, it is understood that the first condition (that the number of peaks is one) of the two conditions for determining that the diffusion intensity is uniform is satisfied in the cases where $\theta_a = 5°$, $6°$, $7°$, $8°$, and $9°$.

Next, regarding the second condition concerning a ratio C for determining that the diffusion intensity is uniform, specific values of an average intensity A and an intensity variation B and the ratio C obtained from these values are shown together in Table 1. When the value of $\theta_a$ is changed, the range in which the intensity of diffused light is distributed changes, and the diffusion range is minimized when $\theta_a = 2°$, but the area to be used as a reference when paying attention to the second condition was set at 3 mm×6 mm=18 mm² at the center such that an evaluation can be made also in the case where $\theta_a = 2°$. In addition, in the case of the present experimental example, the "diffuser plate having a diffusion angle identical to the diffuser plate 1 of interest, and only including a single partial region AR" is the diffuser plate only including a single partial region AR (that is, a sample of No. 8) whose diffusion angle is 9°.

As is clear from the manner in which the ratio C changes shown in Table 1 above, it is understood that samples in which the value of the ratio C is larger than the value of the ratio C in the sample of No. 8 among samples that satisfy the above-described first condition are samples in which $\theta_a = 5°$, $6°$, $7°$, and $8°$. From such a result, it is understood that samples of No. 4 to No. 7 (samples in which $\theta_a = 5°$, $6°$, $7°$, and $8°$) corresponding to examples of the present invention satisfy both the above-described two conditions, and achieve a uniform diffusion intensity.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

What is claimed is:

1. A microlens array diffuser plate comprising:
a microlens group positioned on a surface of a transparent substrate, wherein
the microlens group at least corresponding to a light ray entering part in the microlens array diffuser plate includes two or more unit cells that are continuous in an array sequence, and the unit cells include a plurality of microlenses positioned on the surface of the transparent substrate,
the light ray entering part has at least two regions having different average diffusion angles, and
in a first region and a second region positioned closer to an end side of the light ray entering part than the first region in a manner that the second region is adjacent to the first region and having an average diffusion angle smaller than an average diffusion angle of the first region among the regions having different average diffusion angles, average radii of curvature of a plurality of microlenses included in the unit cells that constitute the respective regions satisfy a relational expression expressed by Expression (1) below:

$$\frac{1}{R_a} \le \frac{1}{R_b} < \frac{2}{R_a} \quad \text{Expression (1)}$$

where, in Expression (1) above,
$R_a$ is an average radius of curvature of a plurality of microlenses included in a unit cell that constitutes the second region, and
$R_b$ is an average radius of curvature of a plurality of microlenses included in a unit cell that constitutes the first region,
wherein the unit cells comprise four sides and boundaries on the four sides of the unit cell are such that discontinuousness does not occur in the array sequence, and a non-lens region does not exist between adjacent microlenses, and
between the unit cells, a layout pattern of a plurality of microlenses provided in the unit cells is continuous in a sequence direction of the unit cells.

2. The microlens array diffuser plate according to claim 1, wherein
at least in the light ray entering part,
ridge lines between the microlenses adjacent to each other are nonparallel to each other, and are nonparallel to the transparent substrate, and
planar positions and height positions of vertices of the respective microlenses and location of the ridge lines between the microlenses are made irregular such that a diffraction phenomenon is suppressed.

3. The microlens array diffuser plate according to claim 1, wherein
the first region is positioned at a central portion of the light ray entering part, and
the second region is positioned to surround the first region.

4. The microlens array diffuser plate according to claim 3, wherein
an incoming light ray is a collection of spot light rays output from a plurality of light sources, and
the first region and the second region are located such that the first region has an outer periphery positioned on an inner side of a region of projection of the collection of spot light rays onto the microlens array diffuser plate, and the second region has an outer periphery positioned on an outer side of the region of projection.

5. The microlens array diffuser plate according to claim 3, wherein
the at least two regions having different average diffusion angles include the first region, the second region, and a third region,
the third region is positioned so as to surround the second region, and
the third region has an outer periphery positioned on an outer side of a region of projection of a collection of spot light rays output from a plurality of light sources onto the microlens array diffuser plate.

6. The microlens array diffuser plate according to claim 3, wherein
the first region has an area of more than or equal to 0.04% and less than or equal to 85% of an area of a region used as a diffuser plate, and more than or equal to 0.05% and less than or equal to 92% of an area of a region of projection of a collection of spot light rays output from a plurality of light sources onto the diffuser plate.

7. The microlens array diffuser plate according to claim 1, wherein
an incoming light ray is a collection of spot light rays output from a plurality of light sources, and
the unit cells each have an area larger than an area of one of the spot light rays.

8. The microlens array diffuser plate according to claim 1, wherein
the unit cells each have a diagonal line having a length of less than or equal to 3 mm.

9. The microlens array diffuser plate according to claim 1, comprising:
antireflection layers on surfaces of the microlenses and a surface of the transparent substrate on which the microlens group is not arranged.

10. The microlens array diffuser plate according to claim 9, wherein
each of the antireflection layers is a multilayered structure including $Nb_2O_5$ and $SiO_2$.

11. A display device comprising:
the microlens array diffuser plate according to claim 1.

12. A projection device comprising:
the microlens array diffuser plate according to claim 1.

13. A lighting device comprising:
the microlens array diffuser plate according to claim 1.

14. A designing method of a microlens array diffuser plate including a microlens group positioned on a surface of a transparent substrate, the designing method comprising:
configuring the microlens group at least corresponding to a light ray entering part in the microlens array diffuser plate by two or more unit cells that are continuous in an array sequence, and causing the unit cells to include a plurality of microlenses positioned on the surface of the transparent substrate;
causing the light ray entering part to have at least two regions having different average diffusion angles; and
for a first region and a second region positioned closer to an end side of the light ray entering part than the first region in a manner that the second region is adjacent to the first region and having an average diffusion angle smaller than an average diffusion angle of the first region among the regions having different average diffusion angles, setting average radii of curvature of a plurality of microlenses included in the unit cells that constitute the respective regions so as to satisfy a relational expression expressed by Expression (1) below:

$$\frac{1}{R_a} \leq \frac{1}{R_b} < \frac{2}{R_a} \qquad \text{Expression (1)}$$

where, in Expression (1) above,
$R_a$ is an average radius of curvature of a plurality of microlenses included in a unit cell that constitutes the second region, and
$R_b$ is an average radius of curvature of a plurality of microlenses included in a unit cell that constitutes the first region;
wherein the unit cells comprise four sides and boundaries on the four sides of the unit cell are such that discontinuousness does not occur in the array sequence, and a non-lens region does not exist between adjacent microlenses, and
between the unit cells, a layout pattern of a plurality of microlenses provided in the unit cells is continuous in a sequence direction of the unit cells.

* * * * *